(12) United States Patent
Williams

(10) Patent No.: US 7,510,044 B2
(45) Date of Patent: Mar. 31, 2009

(54) POWER STEERING APPARATUS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 131 days.

(21) Appl. No.: 11/801,948

(22) Filed: May 11, 2007

(65) Prior Publication Data

US 2008/0277186 A1   Nov. 13, 2008

(51) Int. Cl.
*B62D 5/06* (2006.01)
*B62D 5/08* (2006.01)

(52) U.S. Cl. .................. 180/403; 180/402; 180/406; 180/405; 180/441; 180/442; 180/133; 180/132

(58) Field of Classification Search .......... 180/403, 180/406, 405, 441, 442, 417
See application file for complete search history.

(56) References Cited

U.S. PATENT DOCUMENTS

| | | | | |
|---|---|---|---|---|
| 3,747,725 A | | 7/1973 | Feutsel et al. | |
| 4,237,993 A | * | 12/1980 | Jablonsky | 180/406 |
| 4,400,938 A | * | 8/1983 | Ohe | 60/429 |
| 4,410,057 A | * | 10/1983 | Johnson | 180/406 |
| 4,449,365 A | * | 5/1984 | Hancock | 60/422 |
| 4,553,389 A | | 11/1985 | Tischer et al. | |
| 4,625,624 A | * | 12/1986 | Adams | 91/375 A |
| 4,798,256 A | * | 1/1989 | Fassbender | 180/406 |
| 5,257,670 A | | 11/1993 | Miller et al. | |
| 6,102,150 A | * | 8/2000 | Bohner et al. | 180/403 |
| 6,152,254 A | * | 11/2000 | Phillips | 180/422 |
| 6,173,728 B1 | * | 1/2001 | Venable et al. | 137/112 |
| 6,336,519 B1 | * | 1/2002 | Bohner et al. | 180/403 |
| 6,354,393 B1 | * | 3/2002 | Ahlert et al. | 180/403 |
| 6,546,322 B2 | | 4/2003 | Williams | |
| 6,945,352 B2 | * | 9/2005 | Phillips | 180/422 |
| 6,966,398 B2 | | 11/2005 | Williams et al. | |
| 7,055,643 B2 | | 6/2006 | Williams et al. | |
| 7,318,386 B2 | * | 1/2008 | Dudra et al. | 114/150 |
| 2006/0175119 A1 | | 8/2006 | Broughton | |

* cited by examiner

*Primary Examiner*—Paul N. Dickson
*Assistant Examiner*—Marlon A Arce
(74) *Attorney, Agent, or Firm*—Tarolli, Sundheim, Covell & Tummino LLP

(57) ABSTRACT

A power steering apparatus (10) includes a first pump (24) which is continuously driven to supply fluid under pressure to a power steering motor assembly (18). A second pump (32) is driven by the engine (30) of the vehicle when a predetermined vehicle operating condition occurs. The predetermined vehicle operating condition may, if desired, be operation of the engine (30) of a vehicle at a speed which is less than a predetermined speed. A flow control valve (40) directs fluid flow from the first and second pumps to the power steering motor assembly (18) during operation of both pumps. A diverter valve (62) directs fluid from the first pump (24) along a fluid flow path which is spaced from the flow control valve (40) during operation of only the first pump. The first pump (24) may, if desired, be smaller than the second pump (32).

9 Claims, 1 Drawing Sheet

POWER STEERING APPARATUS

BACKGROUND OF THE INVENTION

The present invention is directed to an apparatus for use in turning steerable vehicle wheels.

In a known power steering system, an engine driven pump provides a fixed volume of fluid output per revolution during operation of the pump. Therefore, the rate of flow of fluid from the engine driven pump is proportional to engine speed. The pump in this known power steering system is sized to provide an acceptable rate of fluid flow when the engine is idling.

A known power steering motor assembly has an open center valve which requires a constant rate of fluid flow, independently of engine speed. In order to obtain a constant rate of fluid flow independently of engine speed, a known power steering system utilizes a flow control valve having a spring loaded valve spool which is moved to maintain a constant pressure drop across a control orifice.

SUMMARY OF THE INVENTION

An improved apparatus for turning vehicle steerable wheels includes a power steering motor assembly. A first pump is continuously driven by an engine of the vehicle to supply fluid under pressure to the power steering motor assembly during operation of the engine. A second pump is driven by the engine upon the occurrence of a predetermined vehicle operating condition. The predetermined vehicle operating condition may occur when the operating speed of the engine is less than a predetermined speed. The second pump may, advantageously, discharge fluid at a greater rate than the first pump when the first and second pumps are being driven at the same speed.

A fluid flow control apparatus is provided to control fluid flow from the pumps to the power steering motor assembly. The fluid flow control apparatus may include a flow control valve which directs fluid flow from the first and second pumps to the power steering motor assembly during operation of both of the first and second pumps. A diverter valve directs fluid flow from the first pump to the power steering motor assembly along a fluid flow path which is spaced from the flow control valve when the second pump is not being driven by the engine of the vehicle.

The apparatus of the present invention includes many different features which may advantageously be utilized together as disclosed herein. Alternatively, the features may be utilized separately or in various combinations with each other and/or with features from the prior art.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF SPECIFIC PREFERRED EMBODIMENTS OF THE INVENTION

Figure 1:
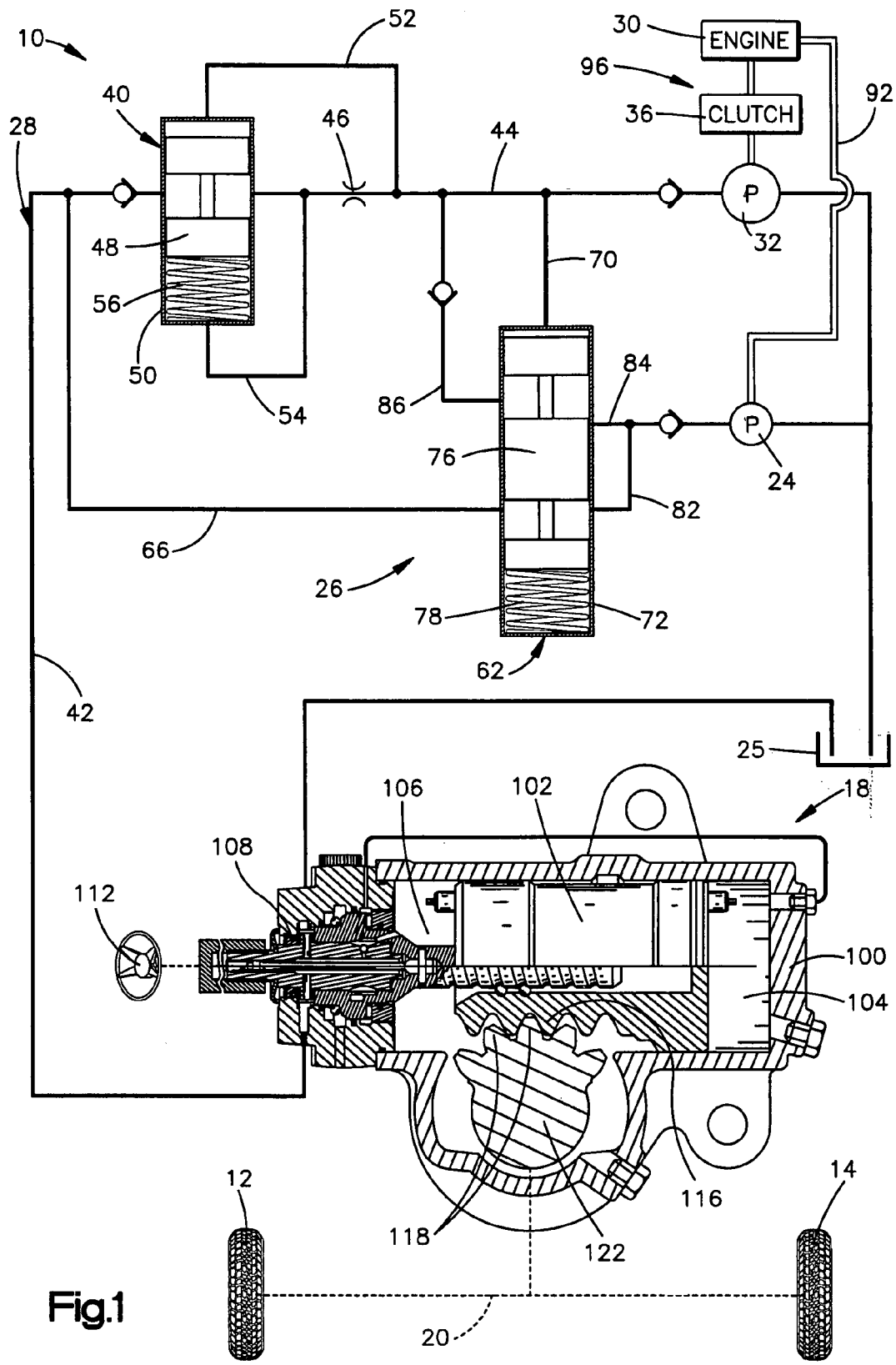
FIG. 1 Is a schematic illustration of a power steering apparatus constructed and operated in accordance with the present invention.

A power steering apparatus 10 (FIG. 1) is used to turn steerable vehicle wheels 12 and 14. The power steering apparatus 10 includes a known power steering motor assembly 18. The power steering motor assembly 18 is connected with the steerable vehicle wheels 12 and 14 by a steering linkage 20.

A first pump 24 is connected in fluid communication with a fluid reservoir 25. The first pump is also connected in fluid communication with the power steering motor assembly 18 by a fluid flow control apparatus 26 and a conduit assembly 28. The first pump 24 is continuously driven by an engine 30 of the vehicle, during operation of the engine. Therefore, during operation of the engine 30, the pump 24 continuously supplies fluid under pressure to the power steering motor assembly 18.

A second pump 32 is connected in fluid communication with the reservoir 25. The second pump 32 is connected in fluid communication with the power steering motor assembly 18 by the fluid flow control apparatus 26 and the conduit assembly 28. The second pump 32 is driven by power transmitted from the engine 30 through a clutch 36. The clutch 36 is operable between an engaged condition in which it is effective to transmit power from the engine 30 to the second pump 32 and a disengaged condition in which the clutch 36 is ineffective to transmit power to the second pump. Therefore, during operation of the engine 30, the pump 32 supplies fluid to the power steering motor assembly 18 only when the clutch 36 is in the engaged condition.

The fluid flow control apparatus 26 includes a flow control valve 40 which is connected in fluid communication with the power steering motor assembly 18 by a conduit 42 in the conduit assembly 28. The flow control valve 40 is also connected with the pump 32 by a conduit 44 in the conduit assembly 28. The conduit 44 is connected with the flow control valve 40 through a control orifice 46.

A valve spool 48 is moved in a housing 50 of the flow control valve 40 under the influence of fluid pressure conducted from an upstream side of the control orifice 46 by a conduit 52. Similarly, the valve spool 48 is moved in the housing 50 under the influence of fluid pressure conducted from a downstream side of the control orifice 46 by a conduit 54. The fluid pressure conducted through the conduit 54 and applied to the lower (as viewed in FIG. 1) end portion of the valve spool 48, is assisted by a biasing spring 56 disposed between a lower end portion of the housing 50 and the valve spool. The flow control valve 40 and control orifice 46 cooperate to maintain a constant rate of flow of fluid from the conduit 44 through the conduit 42 to the power steering motor assembly 18.

The fluid flow control apparatus 26 also includes a diverter valve 62. When only the first pump 24 is being driven by the engine 30, that is, when the clutch 36 is in a disengaged condition, the diverter valve 62 directs fluid from the first pump 24 to the conduit assembly 28. The fluid flows from the continuously driven, first pump 24 through the unactuated diverter valve 26 to a conduit 66 which is connected directly to the conduit 42 in the conduit assembly 28. Therefore, at this time, fluid flowing from the first pump 24 is conducted through the diverter valve 62 to the power steering motor assembly 18 without passing through the flow control valve 40. Therefore, at this time, efficient vehicle operation is promoted since the fluid from the pump 24 does not pass through the control orifice 46 and flow control valve 40.

When the clutch 36 is in an engaged condition, the engine 30 is effective to drive both the first pump 24 and the second pump 32. At this time, fluid pressure from the second pump 32 is conducted through a conduit 70 to the upper (as viewed in FIG. 1) end portion of a diverter valve housing 72. This fluid pressure is effective to move a diverter valve spool 76 downward (as viewed in FIG. 1) against the influence of a biasing spring 78. As the diverter valve spool 76 moves downward, fluid flow from the pump 24 to the conduit 66 is blocked. At the same time, a fluid flow path is established through the diverter valve 62 to the conduit 44 and flow control valve 40.

The diverter valve spool 76 moves downward (as viewed in FIG. 1) from the unactuated position of FIG. 1 to an actuated position under the influence of fluid pressure conducted from the pump 32 through the conduit 70 to the diverter valve 62. As the diverter valve spool 76 moves to the actuated position, fluid flow from the pump 24 to the diverter valve 62 through a conduit 82 is blocked by the valve spool. At the same time, a fluid flow path from the pump 24 through a conduit 84 and the diverter valve 62 is opened. This enables fluid to flow from the diverter valve 62 through a conduit 86 to the conduit 44.

At this time, both the first pump 24 and the second pump 32 are being driven by the engine 30. Therefore, the fluid flow from the first pump 24 joins the fluid flow from the second pump 32 in the conduit 44. The combined fluid flow is conducted through the control orifice 46 and flow control valve 40 to the power steering motor assembly 18. At this time, the flow control valve 40 is effective to regulate the fluid pressure of the combined fluid flows from the first pump 24 and the second pump 32 to maintain a constant fluid flow rate to the power steering motor assembly 18.

The clutch 36 is operated from a disengaged condition to an engaged condition upon the occurrence of a predetermined vehicle operating condition. In the illustrated embodiment of the invention, the predetermined operating condition occurs as the speed of operation of the engine 30 decreases from a speed greater than a predetermined speed to a speed which is less than the predetermined speed. Thus, when the engine 30 is operating at a speed which is greater than the predetermined speed, only the first pump 24 is driven by the engine 30 through a drive train 92. At this time, the vehicle will be traveling at a speed such that the output from the first pump 24 will be sufficient to supply the power steering motor assembly 18.

The first pump 24 is sized so that when the engine 30 is operating at a speed above the predetermined speed, the output from the first pump 24 is sufficient to supply the power steering motor assembly 18. When the clutch 36 is disengaged and the engine 30 is operating at a speed above the predetermined speed, the output from the pump 24 is not regulated by the cooperation between the flow control orifice 46 and the flow control valve 40. Therefore, the power steering apparatus 10 is capable of energy efficient operation.

When the speed of the engine 30 is below the predetermined speed and the clutch 36 is engaged, both the first pump 24 and the second pump 32 are driven by the engine 30. At this time, the fluid pressure from the second pump 32 effects operation of the diverter valve 62 to direct the fluid flow from the first pump 24 to the conduit 44. The combined fluid flow from the two pumps 24 and 32 is conducted from the conduit 44 through the flow control valve 40 to maintain a fixed rate of fluid flow to the power steering motor assembly 18 during operation of the power steering motor assembly when the engine 30 is operating at a relatively low speed.

During low speed operation of the engine 30, the vehicle will be conducting parking and similar maneuvers. The fluid supplied by the two pumps 24 and 32 will be more than adequate to perform these maneuvers and to maintain a constant flow rate of fluid to the power steering motor assembly 18. It is contemplated that the occurrence of a predetermined vehicle operating condition other than a reduction of engine speed below a predetermined speed may be used to initiate operation of the clutch 36 to the engaged condition. For example, the occurrence of movement of the vehicle at a speed less than a predetermined speed may be used to initiate operation of the clutch 36 to the engaged condition.

The first pump 24 is continuously driven by a drive train 92 which extends between the engine 30 and the pump 24. The drive train 92 is effective to drive the pump 24 at the same speed as the engine 30. However, if desired, gears may be provided in the drive train to either reduce or increase the rate at which the pump 24 is driven relative to the speed of the engine 30. Although the pump 24 is continuously driven by the drive train 92 during operation of the engine 30, a clutch may be provided in the drive train 92 if desired. This would enable operation of the first pump 24 to be interrupted during all or a portion of the operation of the second pump 32.

The second pump 32 is connected with the engine 30 by a drive train 96 which includes the clutch 36. When the clutch 36 is disengaged, during operation of the engine 30 at a speed above the predetermined speed, the pump 32 is not driven by the engine. However, when the clutch 36 is engaged, the pump 32 is driven by the engine at a speed which corresponds to the speed of operation of the engine. Of course, gearing could be provided in the drive train 96 so that the speed at which the second pump 32 is driven by the engine, when the clutch 36 is engaged, is different that the speed at which the engine 30 operates.

The clutch 36 is effective to transmit force only when the engine 30 is operated at a speed which is below a predetermined speed. The clutch 36 is engaged only at relatively low engine speeds, that is speeds corresponding to parking maneuvers and similar operations.

The clutch 36 is of the centrifugal type. Since the clutch 36 is only engaged when the input from the engine 30 is below a predetermined speed, the clutch may be referred to as a "reverse acting" centrifugal clutch. Of course, a different type of clutch may be utilized if desired. For example, an electrically actuated clutch may be utilized. If this is done, a sensor may be connected with the engine 30 to detect when the engine is operating at a speed lower than the predetermined speed. Alternatively, the clutch may be actuated in response to a sensor detecting that the vehicle is moving at a speed below a predetermined speed.

In the embodiment of the invention illustrated in FIG. 1, the first pump 24 is smaller than the second pump 32. Therefore, the second pump 32 discharges fluid at a greater rate than the first pump 24 when the first and second pumps 24 and 32 are being driven at the same speed by the engine 30. The first pump 24 is sized so that the output from the first pump is optimized when the engine 30 is being driven at speeds corresponding to common vehicle cruising speeds. Although the second pump 32 is advantageously larger than the first pump 24, the two pumps 32 and 24 may be the same size if desired.

The power steering motor assembly 18 is of the well known integral type and includes a housing 100 which encloses a piston 102. The piston 102 cooperates with the housing 100 to define a head end chamber 104 and a rod end chamber 106. A steering control valve 108 controls fluid flow to and from the head and rod end chambers 104 and 106 in a known manner in response to rotation of a steering wheel 112. Fluid discharged from the power steering motor assembly 18 is conducted to the reservoir 25.

The piston 102 has a linear array 116 of rack teeth which are disposed in meshing engagement with an arcuate array of pinion teeth 118. The pinion teeth 118 are disposed on a sector gear 122 which is connected with the steering linkage 20. The power steering motor assembly 18 has a known construction which is generally similar to the construction of the power steering motor assembly disclosed in U.S. Pat. No. 6,546,322.

Of course, the power steering motor assembly may have a different type of construction if desired.

When a vehicle in which the engine 30 is disposed is being driven along a highway at normal cruising speeds, the clutch 36 is in a disengaged condition. Therefore, the large pump 32 is not being driven at this time. However, the small pump 24 is being driven. At this time, the diverter valve 62 is in the unactuated condition illustrated in FIG. 1 and is effective to direct fluid flow from the small pump 24 around the flow control valve 40 through the conduit 66. The relatively small first pump 24 discharges fluid at a flow rate which is sufficient to satisfy the needs of the power steering motor assembly 18 at normal vehicle cruising speeds.

When a vehicle in which the engine 30 is disposed slows and is performing maneuvers similar to parking maneuvers, the speed of operation of the engine 30 will decrease to a speed below a predetermined speed. When this occurs, the clutch 36 will operate from a disengaged condition to an engaged condition.

When the clutch 36 is in the engaged condition, the relatively large second pump 32 is driven by the engine 30. The output from the second pump 32 is conducted through the conduit 44 to the flow control valve 40. In addition, the output pressure from the pump 32 is conducted through the conduit 70 to the diverter valve 62.

The fluid pressure conducted through the conduit 70 to the diverter valve 62 effects downward (as viewed in FIG. 1) movement of the valve spool 76 against the influence of the biasing spring 78. This results in fluid flow through the conduit 82 being blocked by the valve spool and the conduit 84 being connected in fluid communication with the conduit 86. Connection of the conduit 84 in fluid communication with the conduit 86 results in the output of the relatively small first pump 24 being conducted to the conduit 44. The fluid flows from the two pumps 24 and 32 are combined in the conduit 44 and conducted through the flow control valve 40 to the power steering motor assembly 18. This provides a flow of fluid which can satisfy the demands of the power steering motor assembly 18 during operation of the vehicle and engine 30 at relatively slow speeds.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. An apparatus for use in turning steerable vehicle wheels, said apparatus comprising:
a power steering motor assembly connected with the steerable vehicle wheels;
a first pump which is connected with said power steering motor assembly and is continuously driven by an engine of the vehicle, during operation of the engine, to supply fluid under pressure to said power steering motor assembly;
a second pump which is connected with said power steering motor assembly and is driven by the engine of the vehicle when the operating speed of the engine is less than a predetermined speed;
a flow control valve which is connected with said power steering motor assembly and said first and second pumps, said flow control valve directs fluid flow from said first and second pumps to said power steering motor assembly during operation of both said first pump and said second pump; and
a diverter valve which is connected with said power steering motor assembly and directs fluid flow from said first pump to said power steering motor assembly along a fluid flow path which is spaced from said flow control valve when the operating speed of the engine is greater than the predetermined operating speed.

2. An apparatus or set forth in claim 1 further including a clutch assembly which is connected with said second pump and the engine of the vehicle, said clutch assembly being effective to transmit power from the engine to said second pump during operation of the engine at a speed which is less than the predetermined speed, said clutch assembly being ineffective to transmit power from the engine to said second pump during operation of the engine at a speed which is greater than the predetermined speed.

3. An apparatus as set forth in claim 1 wherein said second pump discharges fluid at a greater rate than said first pump when said first and second pumps are being driven at the same speed.

4. An apparatus as set forth in claim 1 wherein said diverter valve is operated from a first condition to a second condition under the influence of fluid pressure conducted from said second pump, said diverter valve being effective to direct fluid flow from said first pump to said power steering motor assembly along the fluid flow path which is spaced from said flow control valve when said diverter valve is in the first condition, said diverter valve being effective to direct fluid flow from said first pump to said power steering motor assembly along a fluid flow path which extends through said flow control valve when said diverter valve is in the second condition.

5. An apparatus as set forth in claim 1 further including a centrifugal clutch which is connected with said second pump and the engine of the vehicle, said centrifugal clutch being operable from a disengaged condition to an engaged condition as the speed of operation of the engine decreases from a speed greater than said predetermined speed to a speed which is less than said predetermined speed, said centrifugal clutch being effective to transmit force from the engine to said second pump when said centrifugal clutch is in the engaged condition, said centrifugal clutch being operable from the engaged condition to the disengaged condition as the speed of operation of the engine increases from a speed less than said predetermined speed to a speed which is greater than said predetermined speed, said centrifugal clutch being ineffective to transmit force from the engine to said second pump when said centrifugal clutch is in the disengaged condition.

6. An apparatus for use in turning steerable vehicle wheels, said apparatus comprising:
a power steering motor assembly connected with the steerable vehicle wheels;
a first pump which is connected with said power steering motor assembly and is continuously driven by an engine of the vehicle, during operation of the engine, to supply fluid under pressure to said power steering motor assembly;
a second pump which is connected with said power steering motor assembly and is driven by the engine of the vehicle upon the occurrence of a predetermined vehicle operating condition;
a flow control valve which is connected with said power steering motor assembly and said first and second pumps, said flow control valve directs fluid flow from said first and second pumps to said power steering motor assembly during operation of both said first pump and said second pump; and
a diverter valve which is connected with said power steering motor assembly and directs fluid flow from said first pump to said power steering motor assembly along a fluid flow path which is spaced from said flow control valve during operation of only said first pump.

7. An apparatus as set forth in claim 6 further including a clutch assembly which is connected with said second pump and the engine of the vehicle, said clutch assembly being effective to transmit power from the engine to said second pump during operation of both said first pump and said second pump, said clutch assembly being ineffective to transmit power from the engine to said second pump during operation of only said first pump.

8. An apparatus as set forth in claim 6 wherein said diverter valve is operated from a first condition to a second condition under the influence of fluid pressure conducted from said second pump, said diverter valve being effective to direct fluid flow from said first pump to said power steering motor assembly along the fluid flow path which is spaced from said flow control valve when said diverter valve is in the first condition, said diverter valve being effective to direct fluid flow from said first pump to said power steering motor assembly along a fluid flow path which extends through said flow control valve when said diverter valve is in the second condition.

9. An apparatus as set forth in claim 6 wherein said second pump discharges fluid at a greater rate than said first pump when said first and second pumps are being driven at the same speed.

* * * * *